United States Patent Office 3,264,814
Patented August 9, 1966

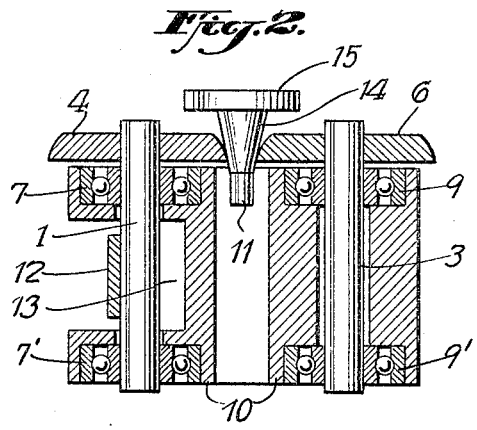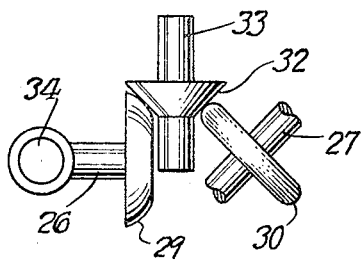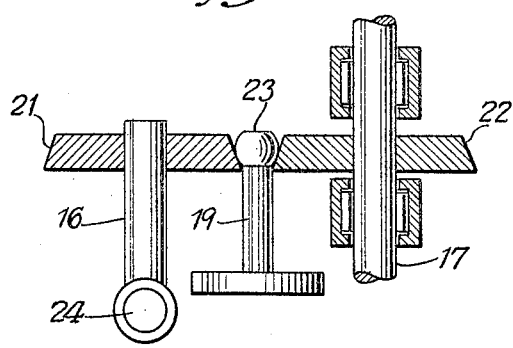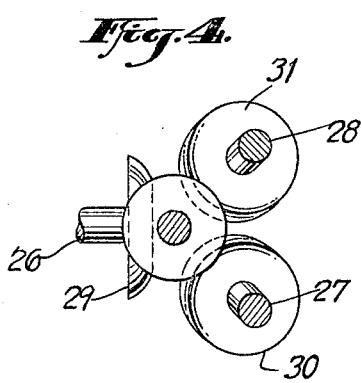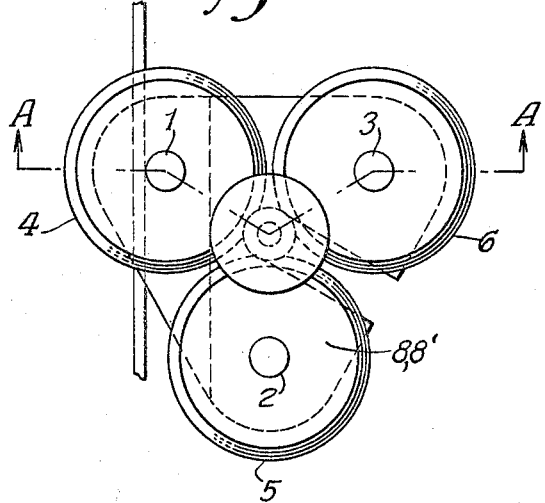
INVENTORS.
HEINZ KUSTER.
ARMIN GRAF.

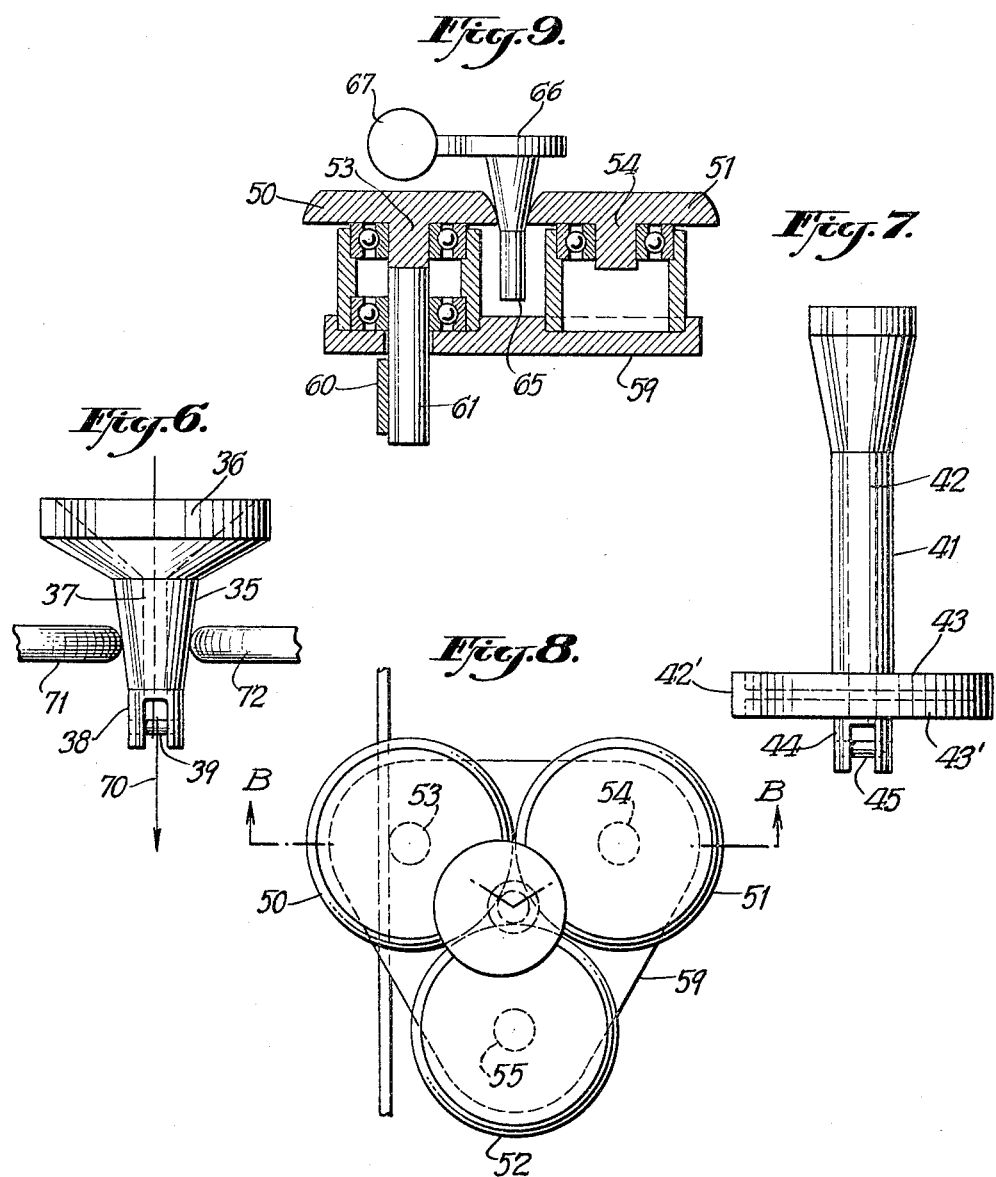

3,264,814
FRICTION GEAR
Heinz Kuster, Lichtensteig, and Armin Graf, Bronshofen, Switzerland, assignors to Heberlein Patent Corporation, New York, N.Y., a corporation of New York
Filed Feb. 14, 1962, Ser. No. 173,263
Claims priority, application Switzerland, Feb. 23, 1961, 2,187/61
9 Claims. (Cl. 57—77.45)

This invention relates to a rotor-spindle device and more particularly to improvements in friction gears.

Friction gears are known in which the rotor is held fast by a plurality of rollers in all planes of movement, one of said rollers being driven. Heretofore, any out of balance, either dynamic or static, caused radial forces or oscillations which resulted in considerable bearing damage in a relatively short period of time. This is especially true in installations where the rotor is revolving at over 100,000 revolutions per minute.

The present invention is designed to overcome the aforementioned basic limitations that are attendant upon the use of conventional rotor-spindle assemblies, and with this in mind it contemplates the provision of a novel form of friction gear assembly which is characterized in that it employs at least three rollers freely rotatable about their axes, at least one of which rollers is driven, and a rotor having the mass thereof distributed substantially towards the outer periphery and which is supported at at least three points by the aforementioned rollers.

The rollers each desirably include a shaft and a plate suitably mounted thereon. The edge of the plate may have the shape of a truncated cone, a spherical section, or may simply be of arcuate configuration. Further, the axes of the shafts may also be angularly disposed one to the other, that is the axes need not be parallel.

An important area of application of the friction gear, in accordance with the invention, is its use as a false twisting device for crimping textile yarn. These devices have twist imparters which rotate at high speeds, momentarily entrain the yarn and effect a twisting of the passing filament and then an untwisting to its original condition. When using this rotor-spindle as a false twisting device the rotor is axially bored and includes a twist imparter preferably mounted at one end.

A further application of the friction gear in accordance with the invention lies in its use as a control member, for example, in electronic feed controls. For this purpose, an eccentric plate may be mounted at one end of the rotor to open or close an electric circuit with each revolution.

Further objects, features and advantages of the invention hereof will appear from the detailed description given below, taken in connection with the accompanying drawings which form a part of this specification and illustrate preferred embodiments thereof.

In the drawings:

FIG. 1 is a plan view showing one embodiment of a rotor-spindle device in accordance with the present invention;

FIG. 2 is a sectional view taken along line A—A of FIG. 1;

FIG. 3 is an analogous sectional view as shown in FIG. 2, but of another embodiment of this invention;

FIG. 4 is a plan view showing a third embodiment of the present invention;

FIG. 5 is a side view of the device of FIG. 4;

FIG. 6 is a detail elevation showing one form of rotor-spindle construction;

FIG. 7 is a detail elevation showing still another form of rotor construction;

FIG. 8 is a plan view showing a fourth embodiment of a rotor-spindle device in accordance with this invention, and FIG. 9 is a vertical sectional view taken along line B—B of FIG. 8.

Referring to the drawings in further detail, the device of FIGS. 1 and 2 has three rollers, each comprising a shaft 1, 2 and 3, with circular plates 4, 5 and 6 joined to their respective shafts, and anti-friction bearings 7, 7'; 8, 8'; and 9, 9' adapted to support said shafts on a supporting member or carrier bracket 10. The aforementioned plates 4, 5 and 6 have the edge configuration of a spherical section whose diameters at right angles to the axes of rotation increase downwardly. Thus the edges of the plates which serve as supporting surfaces for a rotor 11 are arced. The shaft 1 is driven by any convenient means, for example, shown here is an endless flat belt 12 which is guided through an aperture 13 in the carrier bracket 10 and is in frictional contact with shaft 1. The erect rotor 11 has a conical portion 14 which seats on one point of each of the aforementioned plates 4, 5 and 6, and is also provided with a platelike headpiece 15. The shape of the rotor 11 makes it possible for its center of gravity to be located near the plane formed by the points of support, so that dynamic unbalance is kept to a minimum. It is an advantage to provide the rotor with an aperture which, for example, is shown (numeral 36 in FIG. 6 and 43, 43' in FIG. 7). Thus the mass of the rotor is shifted correspondingly toward the circumference whereby a greater moment of inertia is imparted to the rotor as compared to the total mass, so that relatively greater radial stresses may be imparted thereon without adverse effects.

The embodiment shown in FIG. 3 has a suspended rotor 19, which is supported on three rotating rollers (one not shown). The rollers shown each include a shaft 16, 17 and plates 21, 22 joined to the respective shafts. Said plates have the shape of truncated cones. An enlarged portion 23 of rotor 19 is generally spherically shaped and of upwardly increasing diameter at right angles to the axes of rotation in the region of support or bearing surface. It rests at one point on the edge of each of the three plates. Drive is effected by means of an electric motor 24 suitably connected to shaft 16.

FIGS. 4 and 5 illustrate another embodiment of this invention. The three rollers each include a shaft 26, 27 and 28 to which is joined plates 29, 30 and 31, respectively. The axes of shafts 27 and 28 are inclined at an angle of 45° and the axis of shaft 26 is positioned 90° from the axis of rotor 33. The edge of plate 29 is arced as shown, and the plates 30 and 31 have semi-circular edges. The enlarged portion 32 of rotor 33 is a section of a cone and is supported on the plates 29, 30 and 31. Drive is effected by means of a motor 34 connected to the elongated shaft 26.

In FIG. 6 there is illustrated an upright rotor 35 for use in a false twisting device, which includes an axial bore 37 and a conical upper aperture 36. The lower end of rotor 35 is provided with a bifurcated head 38 with a pin 39 of a hard material, for example, sapphire, passing through the gap of the fork and disposed transversely to the axis of rotation of the rotor. The textile filament 70 to be treated is guided through axial bore 37 and wound one turn about pin 39. The rollers 71 and 72 each have arcuate supporting surfaces for point frictional engagement with rotor 35.

FIG. 7 also shows a rotor 41 for a false twisting device, but of the suspended type. Rotor 41 has an axial bore 42, a plate 42' provided with apertures 43, 43', a bifurcated head 44 with a pin 45. It is noted that when utilizing a suspended rotor, it is possible, for facilitating insertion and removal of the rotor, to mount at least one of the supporting rollers on a pivoted bracket.

FIGS. 8 and 9 illustrate an embodiment of this invention useful as an electronic feed control device. The supporting rollers here consist of plates 50, 51, 52 which have the edge configuration of a spherical section whose diameters at right angles to the rotational axis increase downwardly, and seat on recessed lugs 53, 54, 55, respectively, which are provided with suitable anti-friction bearings and are mounted on supporting frame 59. Drive is effected by means of flat belt 60 in tangential frictional contact with a shaft 61 which is interconnected with lug 53. The upright rotor 65 is provided at its upper end with an eccentric plate 66, which at each revolution makes contact with a switching device illustrated generally at 67.

The shape and mass distribution of the aforementioned rotors is important. The mass of the rotor is disposed toward the outer circumference whereby a greater moment of inertia is imparted to the rotor relative to its total mass. This means that greater radial forces or stresses may be withstood without adverse effects.

Although certain particular embodiments of the invention are herein disclosed for purposes of explanation, various obvious modifications, thereof, after study of this specification, will be apparent to those skilled in the art to which the invention pertains. Reference should, accordingly, be had to the appended claims in determining the scope of the invention.

What is claimed and desired to be secured by Letters Patent is:

1. A friction gear assembly comprising at least three rollers, at least one of which is driven, a rotor having the mass thereof distributed substantially towards its outer periphery, and said rotor being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

2. A friction gear assembly comprising at least three rollers, at least one of said rollers being driven, a rotor having the mass thereof distributed substantially towards its outer periphery, a circular bearing surface on said rotor formed by upwardly increasing transverse diameters, and said rotor bearing surface being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

3. A friction gear assembly comprising at least three rollers having arcuate peripheral edges respectively, at least one of which is driven, a rotor having the mass thereof distributed substantially towards its outer periphery, and said rotor being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

4. A friction gear assembly comprising at least three rollers having arcuate peripheral edges formed by upwardly decreasing transverse diameters respectively, at least one of which is driven, a rotor having the mass thereof distributed substantially toward its outer periphery, a circular bearing surface on said rotor formed by upwardly increasing transverse diameters, and said rotor being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

5. A friction gear assembly comprising a rotor having the mass thereof distributed substantially towards its outer periphery, at least three plates having arcuate peripheral edges respectively, at least three shafts for carrying said plates, two of said shafts being inclined at an angle of the order of about 40° with respect to the axis of said rotor, the third shaft being disposed at an angle of the order of about 90° with respect to the axis of said rotor and being elongated, motive means operatively connected to said elongated shaft, and said rotor being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

6. A friction gear assembly comprising at least three rollers having arcuate peripheral edges respectively, at least one of which is driven, fixed bearing means for supporting said rollers, a rotor having an eccentrically disposed rim-like circumferential projection thereon and a mass thereof distributed substantially towards its outer periphery, a circular bearing surface on said rotor formed by upwardly increasing transverse diameters, said rotor being positioned to be rotatably driven and radially supported at a single location along its length, such drive and support being provided by frictional engagement of the rotor with the peripheral edge of each of said rollers distributed about and contacting said rotor in a single plane lying perpendicular to the axis of rotational drive produced by said rollers.

7. A friction gear assembly as in claim 1 wherein the axial length of said rotor is greater than the axial length of said roller edges.

8. A friction gear assembly as in claim 7 wherein the mass of said rotor is distributed substantially out beyond the points of engagement of said rotor with said rollers on one side of said single plane.

9. A friction gear assembly as in claim 8 wherein said rotor is formed with an axial opening for passing a thread therethrough to be twisted, and wherein said rotor further includes a twist imparter extending across said opening on the opposite side of said single plane.

References Cited by the Examiner

UNITED STATES PATENTS

| | | | |
|---|---|---|---|
| 297,407 | 4/1884 | Jenkin | 74—209 |
| 661,909 | 11/1900 | Foster | 74—208 |
| 2,183,415 | 12/1939 | Thommies | 74—206 X |
| 2,557,104 | 6/1951 | Hegedus | 57—77.33 |
| 2,559,230 | 7/1951 | Schattler | 74—209 X |
| 2,659,193 | 11/1953 | Hegedus | 57—77.33 |
| 2,737,821 | 3/1956 | Papp | 74—209 |
| 2,811,824 | 11/1957 | Sweet | 57—77.45 |
| 2,850,338 | 9/1958 | Kopczynski | 74—206 X |
| 2,858,706 | 11/1958 | Alexandersson | 74—209 |
| 3,004,453 | 10/1961 | Lang | 74—209 X |
| 3,040,511 | 6/1962 | Gilchrist et al. | 57—77.45 |
| 3,044,247 | 7/1962 | Hilbert | 57—77.45 |
| 3,115,743 | 12/1963 | Brodtmann | 57—77.45 |
| 3,122,932 | 3/1964 | Kopczynski | 74—209 |

FOREIGN PATENTS

| | | |
|---|---|---|
| 651,337 | 3/1951 | Great Britain. |
| 848,971 | 9/1960 | Great Britain. |

STANLEY N. GILREATH, *Primary Examiner.*

MERVIN STEIN, RUSSELL C. MADER, *Examiners.*

J. P. PETRAKES, *Assistant Examiner.*